United States Patent
Chuang et al.

(10) Patent No.: US 7,313,729 B2
(45) Date of Patent: Dec. 25, 2007

(54) LOW-COST DEBUGGING SYSTEM WITH A ROM OR RAM EMULATOR

(75) Inventors: Yi-Hsien Chuang, Kaohsiung (TW); Tzu-Chien Chang, Hsinchu (TW)

(73) Assignee: Winbond Electronics Corp. (TW)

( * ) Notice: Subject to any disclaimer, the term of this patent is extended or adjusted under 35 U.S.C. 154(b) by 507 days.

(21) Appl. No.: 10/783,185

(22) Filed: Feb. 20, 2004

(65) Prior Publication Data
US 2005/0193251 A1    Sep. 1, 2005

(51) Int. Cl.
G06F 11/00    (2006.01)
G06F 9/06    (2006.01)

(52) U.S. Cl. .......................... 714/29; 714/28; 717/134
(58) Field of Classification Search ................. 714/29, 714/28; 717/134
See application file for complete search history.

(56) References Cited

U.S. PATENT DOCUMENTS

| | | | |
|---|---|---|---|
| 4,691,316 A | | 9/1987 | Phillips |
| 4,796,258 A | * | 1/1989 | Boyce et al. ................. 714/29 |
| 5,025,364 A | * | 6/1991 | Zellmer ........................ 703/23 |
| 5,408,637 A | | 4/1995 | Shimizu |
| 5,768,497 A | | 6/1998 | Uemura et al. |
| 5,774,695 A | * | 6/1998 | Autrey et al. ................. 703/26 |
| 5,796,987 A | * | 8/1998 | Habermayr et al. .......... 703/24 |
| 5,798,902 A | | 8/1998 | Blodgett |
| 6,035,422 A | | 3/2000 | Hohl et al. |
| 6,173,419 B1 | | 1/2001 | Barnett |
| 6,263,305 B1 | | 7/2001 | Yamaga |
| 6,665,821 B1 | * | 12/2003 | Miyayama et al. ............ 714/45 |
| 6,691,266 B1 | * | 2/2004 | Winegarden et al. ........ 714/724 |
| 2001/0016922 A1 | * | 8/2001 | Takasugi et al. ............... 714/29 |
| 2002/0053045 A1 | * | 5/2002 | Gillenwater et al. .......... 714/38 |
| 2002/0095280 A1 | * | 7/2002 | Tung et al. .................... 703/24 |

* cited by examiner

*Primary Examiner*—Scott Baderman
*Assistant Examiner*—Joseph Schell
(74) *Attorney, Agent, or Firm*—Raymond Sun (57) ABSTRACT

A low-cost micro-controller debugging system with a ROM or RAM emulator is disclosed. The system includes a target microcontroller (MCU) and at least one ROM connected together, with a debugger unit which debugs that target MCU. A ROM/RAM emulator is connected to the target MCU and the debugger unit for emulating the ROM.

6 Claims, 8 Drawing Sheets

LOW-COST DEBUGGING SYSTEM WITH A ROM OR RAM EMULATOR

FIELD OF THE INVENTION

The following invention relates to diagnostic testers for testing micro-controller systems, and more particularly, relates to debugging systems with a ROM or RAM emulator.

BACKGROUND OF THE INVENTION

Conventionally, processor-based electronic systems, such as micro-controllers or microprocessors, require test instrumentation capable of diagnosing and correcting system faults and faulty electronic components. Such conventional diagnostic testers have relied upon the technique of emulating the system's processing unit in order to control the remainder of the system so that a series of diagnostic tests may be conducted, which isolate the system's processing unit from the remainder of the components.

Generally, the technique of emulation performs two basic functions. In isolating the processing unit from the remainder of its system components, it may quickly be determined whether the processing unit itself is faulty, or whether the problem lies in some other component. Second, using an emulator to control the remainder of the system, rather than the system's processing unit, allows the diagnostic tester much more flexibility in exercising the remaining components of the system, which might not otherwise be possible. This is due to the fact that a processing unit in the system largely depends upon other system components in order to execute programs, and it is very likely that one or more of these other components could be the source of the problem. The diagnostic test routines can effectively remove these components from the system selectively, or exercise these components from the processing unit's emulator in such a way that their functions are isolated from one another so that diagnosis of the system may proceed in an orderly fashion.

The problem with such conventional testers is, however, that they are expensive. A diagnostic tester emulating a processing unit is unique to the particular processor unit used in the device under test (DUT). Since there are a large variety of different processors, as well as micro-controllers, currently in use in various types of systems, it can be very expensive to acquire a plurality of testers, one for each type of processing unit. These customized testers also require the use of complex circuits, which contribute to the overall cost.

Additionally, such conventional testers may require a special in-circuit emulation ("ICE") chip with lots of glue circuitry. Such ICE chips need to be customized as they are not product chips, adding to the overall cost of such testers. Finally, such conventional testers usually end up becoming quite a bulky piece of electronic equipment, due to the complicated electronics and wiring needed. Such bulkiness makes it cumbersome for the test engineers to move the board around, or use it outside of the lab.

Therefore, it is desirable to provide a low-cost debugging system without the conventional ICE-based debugging system. Such debugging system should be able to cooperate with a ROM/RAM emulator, as well as use production chips to access external memory. Finally, it is desirable to provide a debugging system that can be built with lower cost, and yet remain portable for in-lab or on-the-road usage.

SUMMARY OF THE INVENTION

To accomplish the objectives of the present invention, a low-cost micro-controller debugging system with a ROM or RAM emulator is provided. The system includes a target microcontroller (MCU) and at least one ROM connected together, with a debugger unit which debugs that target MCU. A ROM/RAM emulator is connected to the target MCU and the debugger unit for emulating the ROM.

BRIEF DESCRIPTION OF THE DRAWINGS

FIGS. 4-1 and 4-2 illustrate a fourth embodiment in accordance with the present invention, as modified from FIG. 3.

FIGS. 5-1, 5-2 and 5-3 illustrate a fifth embodiment in accordance with the present invention, where they represent a further transformation from the embodiment shown in FIGS. 4-1 and 4-2.

DETAILED DESCRIPTION OF THE PREFERRED EMBODIMENTS

A low-cost micro-controller debugging system with a ROM/RAM emulator is disclosed. The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

Figure 1:
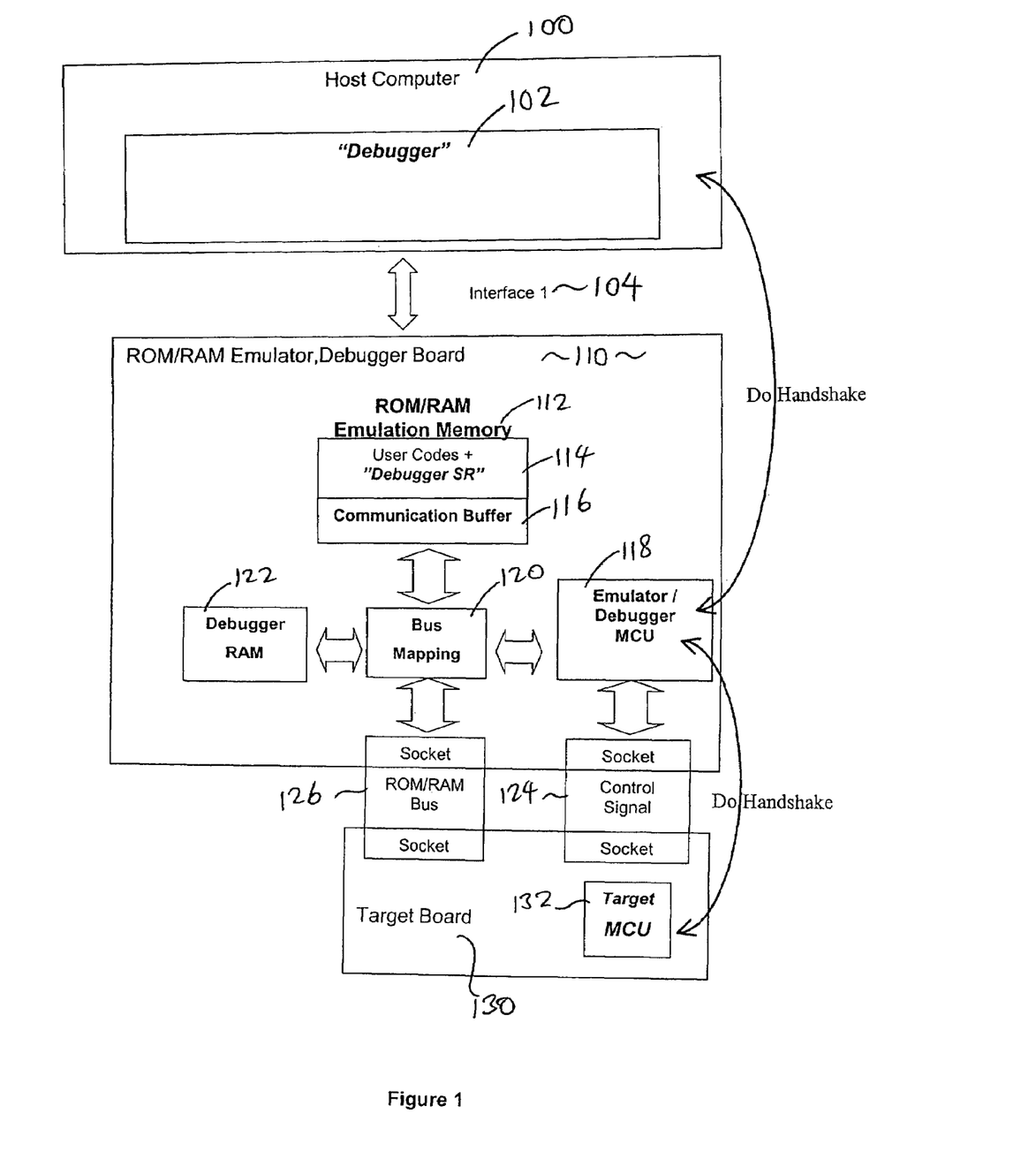
FIG. 1 illustrates an exemplary system block diagram of a first preferred embodiment of the present invention.

FIG. 1 illustrates a simplified system diagram of a first preferred embodiment of the present invention. As shown, a debugger 102 is a graphical user interface ("GUI") tool running in a host computer 100 for providing functions to debug a target board 130. To debug the target board 130, typical functions include:

Downloading and uploading user program codes;
Setting, deleting, enabling and disabling breakpoints;
Showing and modifying registers and memory;
Conducting free-run, step-into, step-out and stop routines.

Connected to host computer 100, via an interface 104, is a ROM/RAM emulator/debugger board 110, which is a combination of a ROM/RAM emulator board and a debugger board. As can be appreciated by those skilled in the art, the ROM or RAM emulator board can be any of the commercially-available products that are currently being provided by numerous manufacturers, and which functions to provide ROM or RAM emulation. A debugger can be a board that provides functionality to debug the target board 130, by using a debugger MCU 118 to handle debugging requests from the debugger 102. As shown in FIG. 1, the functionalities of a (possibly conventional) debugger board and an (possibly conventional) emulator board are implemented by this combination emulator/debugger board 110. The emulator/debugger MCU 118 controls both emulation and debugging.

Additional embodiments of the present invention will be illustrated in connection with description of FIGS. 2, 3, 4-1, 4-2, 5-1, 5-2 and 5-3, of which major functional components are combined or integrated into different embodiments of the present invention. It should be noted that where a component, such as "debugger MCU", is referenced in the following description, it is intended to refer to the same component in all the drawings where the component may appear, either as a stand-alone or combined unit. For example, the debugger MCU is shown as a part of combined emulator/debugger MCU 118 in FIG. 1. The same debugger MCU is also shown as a stand-alone unit 210 in FIG. 2, a combined target/debugger MCU 300 in FIG. 3, a combined MCU 300C in FIG. 4-1, a combined MCU and RAM 300D in FIG. 4-2, a combined MCU 530, 530A and 530B in FIGS. 5-1, 5-2 and 5-3, respectively.

In addition, throughout this disclosure, elements that are designated with the numerals (e.g., debuggers 102, 102A, 102B, 102D, 102E, 102F) are intended to have the same or similar construction, and are not described in greater detail. The letters "A" through "G" that follow the same numeral are intended to mean that the same element is being implemented in a different embodiment.

Implemented in the emulator portion of the emulator/debugger board 110 is a ROM/RAM emulation memory 112, which provides memory space to store program codes (such as the debugger service routine (SR) 114) downloaded from the debugger 102. The debugger SR 114 is the service routine executed by the target MCU 132 to implement debugging requests from the debugger MCU 118. The debugger SR 114 is downloaded into the ROM/RAM emulation memory 112 with user program codes from the debugger 102 before debugging is started. The ROM/RAM emulator memory 112 also has communication buffer 116 to store status, requests and data by target MCU 132 and debugger MCU 118.

The debugger SR 114 is the main procedure for performing debugging requests from the debugger MCU 118. The debugger SR 114 is executed when a software breakpoint instruction is met, or when it is informed by the debugger MCU 118. The debugger SR 114 performs the following main functions:

a) Copying a "loop to itself" instruction to the debugger RAM 122 and then jumps to the copied instruction to release the access of the ROM/RAM emulation memory 112. This function is activated under two conditions:

a-1) When it is requested by the debugger MCU 118, if the debugger MCU 118 is about to store data or requests into the communication buffer 116;

a-2) When data or status of the target MCU 132 is stored in the communication buffer 116, before it is about to be accessed by the debugger MCU 118.

b) Informing the debugger board 110 when:

b-1) a software breakpoint is executed;

b-2) requests are completed from the debugger MCU 118.

c) Parsing requests from the debugger MCU 118 to perform actions, wherein there are two methods to get requests from the debugger MCU 118:

c-1) When a request is stored in the debugger RAM 122, the debugger SR 114 will perform actions according to the request, and store status or return data in the debugger RAM 122 or the communication buffer 116;

c-2) When a request is stored in communication buffer 116, the debugger SR 114 will perform actions according to the request and store status or return data in the debugger RAM 122 or the communication buffer 116.

In addition to the main component debugger MCU 118, the debugger portion of the emulator/debugger board 110 also includes a bus mapping unit 120, which maps all available memory to form one continuous and linear addressing space. The bus mapping unit 120 will pass memory access signals to desired memory components, while keeping such signals away from other memory components. Further, the debugger RAM 122 is used to store status, requests and data by the target MCU 132 and by the debugger MCU 118. Handshaking between the target MCU 132 and the debugger MCU 118 is performed by control signals 124 between the target board 130 and the debugger board 110.

The debugger MCU 118 takes debugging requests from the debugger 102 and passes the debugging requests to the target MCU 132, which will execute the debugger SR 114 to fulfill the requests. Afterwards, it returns data or status from the target MCU 132 to the debugger 102. Currently, there are two methods of passing debugging requests to the target MCU 132. The first method involves having the debugger MCU 118 initially store requests in the debugger RAM 122, and then informing the target MCU 132 to perform them. While the debugger MCU 118 is storing requests in the debugger RAM 122, target MCU 132 executes programs in the ROM/RAM emulation memory 112.

According to the second method, the debugger MCU 118 stores requests in the communication buffer 116, and then informs the target MCU 132 to perform the request. However, since the target MCU 132 is also executing programs in the emulation memory 112, bus contention is avoided by having the debugger MCU 118 first informing the target MCU 132 to copy a "loop to itself" instruction to the debugger RAM 122. Then, the target MCU 132 jumps to the copied instruction to release access of the emulation memory 112. After the target MCU 132 releases the access of the emulation memory 122, the debugger MCU 118 will store requests in the communication buffer 116 and inform the target MCU 132 to perform the requests.

Upon execution, the debugger MCU 118 returns data or status to the debugger 102 under two conditions. First, in a case where the target MCU 132 executes a software breakpoint instruction, the debugger MCU 118, after being informed by target MCU 132, uploads the content of the debugger RAM 122 or the communication buffer 116 (which may have status or data prepared by target MCU 132) to the debugger 102. Second, in a case where the target MCU 132 has finished the requests by the debugger 102, the debugger MCU 118, after being informed by the target MCU 132, uploads the content of the debugger RAM 122 or the communication buffer 116 (which may have status or data prepared by target MCU 132) to the debugger 102.

The bus mapping unit 120 performs the following functions with priority rules:

a) Maps two separate memories (ROM/RAM emulation memory 112 and debugger RAM 122) to form one continuous and linear addressing space;

b) If the target MCU 132 wants to access the debugger RAM 122, the bus mapping unit 120 will direct memory access signals to it;

c) If the target MCU 132 wants to access the ROM/RAM emulation memory 112, the bus mapping unit 120 will direct memory access signals to it;

d) If the debugger MCU 118 wants to access the debugger RAM 122, the bus mapping unit 120 will direct memory access signals to it;

e) If the debugger MCU 118 wants to access the ROM/RAM emulation memory 112, the bus mapping unit 120 will direct memory access signals to it;

f) The debugger MCU 118 has higher priority than the target MCU 132 if they both try to access the debugger RAM 122 at the same time;

e) The debugger MCU 118 has higher priority than the target MCU 132 if they both try to access the ROM/RAM emulation memory 112 at the same time.

The debugger RAM 122 provides additional memory for read/write/execute operations by the target MCU 132 or the debugger MCU 118. To avoid bus contention or conflicts, the target MCU 132 and the debugger MCU 118 cannot access the debugger RAM 122 at the same time after debugging commences.

The target MCU 132 is provided on the target board 130, and supports external memory access in order to be debugged in accordance with the present invention. The target board 130 has an external ROM/RAM bus 126, and sockets, for connection to the emulator/debugger board 110. The target board 130 receives its debugging control signaling from control signals 124 from the emulator/debugger board 110. Control signals 124 are used to provide handshaking between the target MCU 132 and the debugger MCU 118. Additionally, control signals 124 act to force the target MCU 132 to execute the debugger SR 114 by the debugger MCU 118.

Additional Embodiments and Physical Realizations

As previously noted, various functional components shown in FIG. 1 may be further merged, combined or re-arranged into different embodiments, or physical realizations, in accordance with the present invention. Such combinations or arrangements may be readily performed by those skilled in the art, based on the particular set-up or test environment under which the target is tested. All of the following embodiments are based on the basic concepts and principles illustrated in connection with FIG. 1. The different embodiments can be utilized by a user depending on different conditions and requirements, and some of the following embodiments offer different advantages, such as reduced costs, reduced number of components, and greater efficiencies. The different embodiments and arrangements are now further described in connection with their illustrative drawings.

Figure 2:
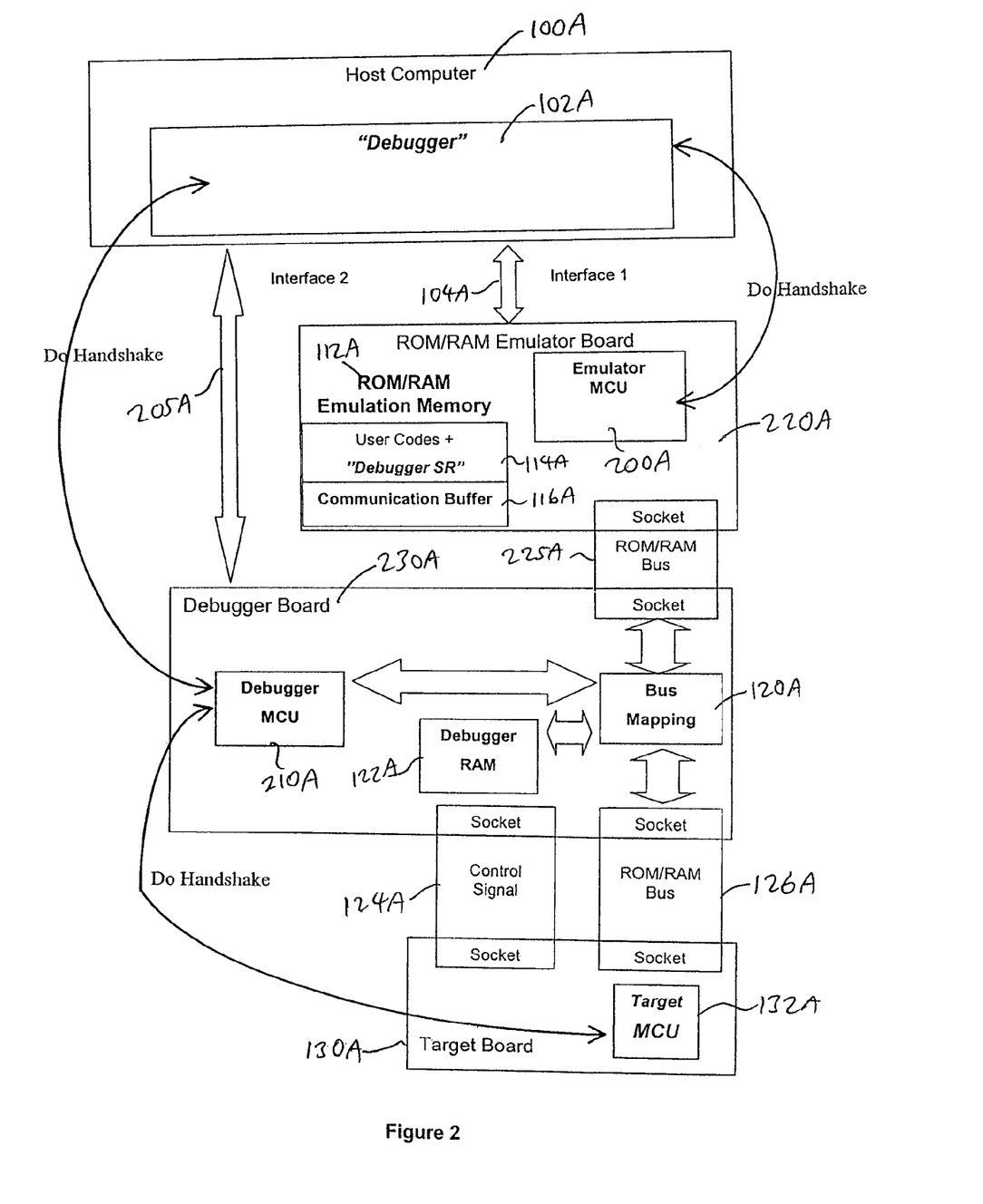
FIG. 2 illustrates a second embodiment in accordance with the present invention, where the ROM/RAM emulator/debugger board is now implemented in two boards.

A second embodiment in accordance with the present invention is shown in FIG. 2. The embodiments in FIGS. 1 and 2 are similar, except for the modifications noted below. First, the ROM/RAM emulator/debugger board 110 is now implemented in two separate boards in FIG. 2: ROM/RAM emulator board 220A and debugger board 230A, which communicate via a ROM/RAM bus 225A. The ROM/RAM emulator board 220A is often provided as a conventional board by many manufacturers, so this embodiment allows for the incorporation of a conventional ROM/RAM emulator board 230A with the system of the present invention. Second, in FIG. 2, another interface 205A now provides communication links between the host computer 100A and the debugger board 230A. Third, the emulator/debugger MCU 118 is now replaced by an emulator MCU 200A in the emulator board 220A, and a debugger MCU 210A in the debugger board 230A. The debugger MCU 210A communicates with the debugger RAM 122A via the bus mapping 120A.

Figure 3:
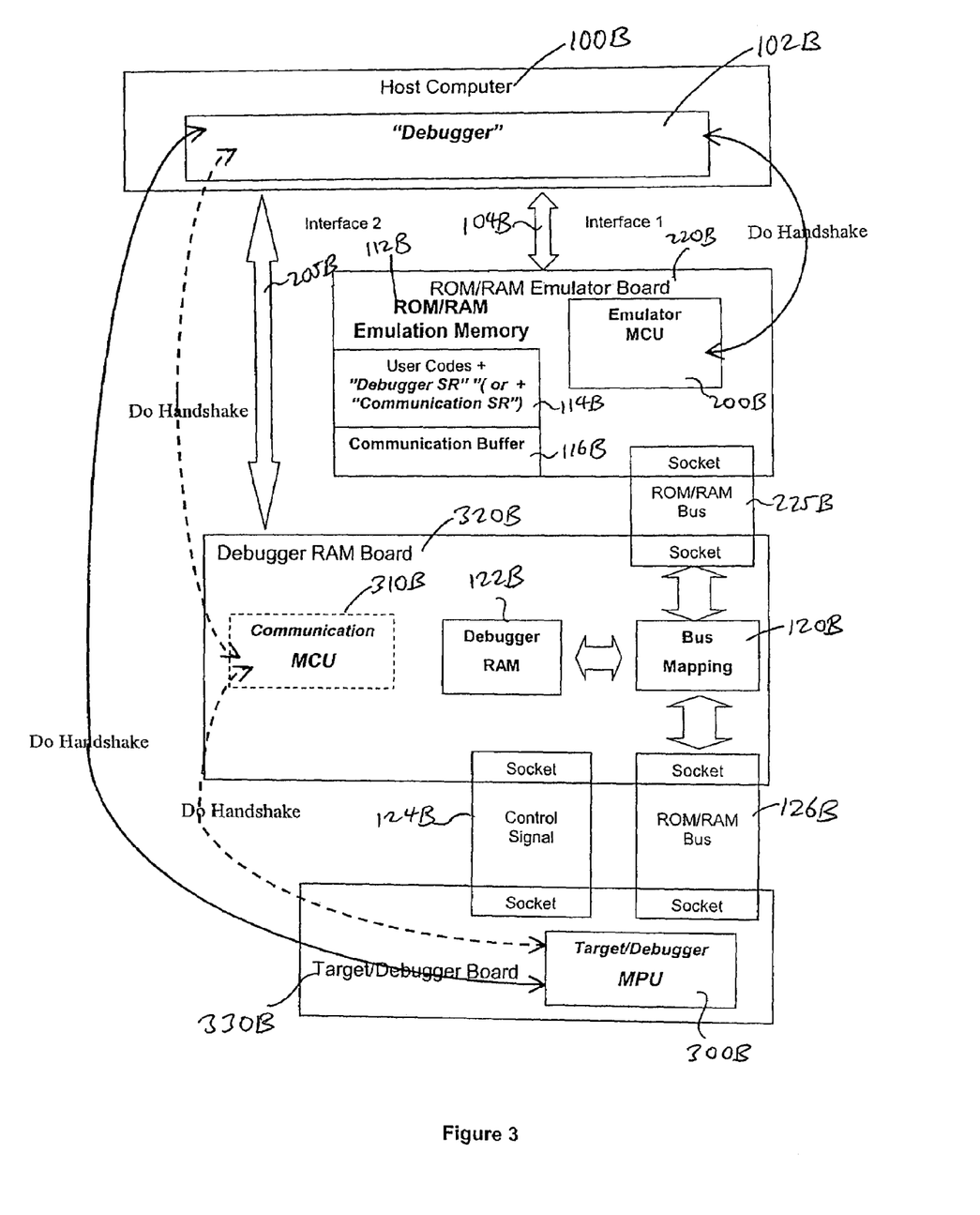
FIG. 3 illustrates a third embodiment in accordance with the present invention, as modified from FIGS. 1 and 2.

FIG. 3 illustrates a third embodiment in accordance with the present invention. Here, comparing FIGS. 2 and 3, target MCU 132A and debugger MCU 210A of FIG. 2 are merged into a combined target/debugger MPU 300B in a target/debugger board 330B in FIG. 3-1, and the debugger 100B communicates directly with the target/debugger MPU 300B. As such, the functionality of debugger MCU 210A is now all implemented by target MPU 300B. What used to be the debugger board 230A is now a debugger RAM board 320B. A communication MCU 310B can optionally be provided on the debugger RAM board 320B. If the communication MCU 310B is provided, the communication handshaking between the host computer 100B and the target/debugger board 330B will be via the communication MCU 310B.

Figure 41:
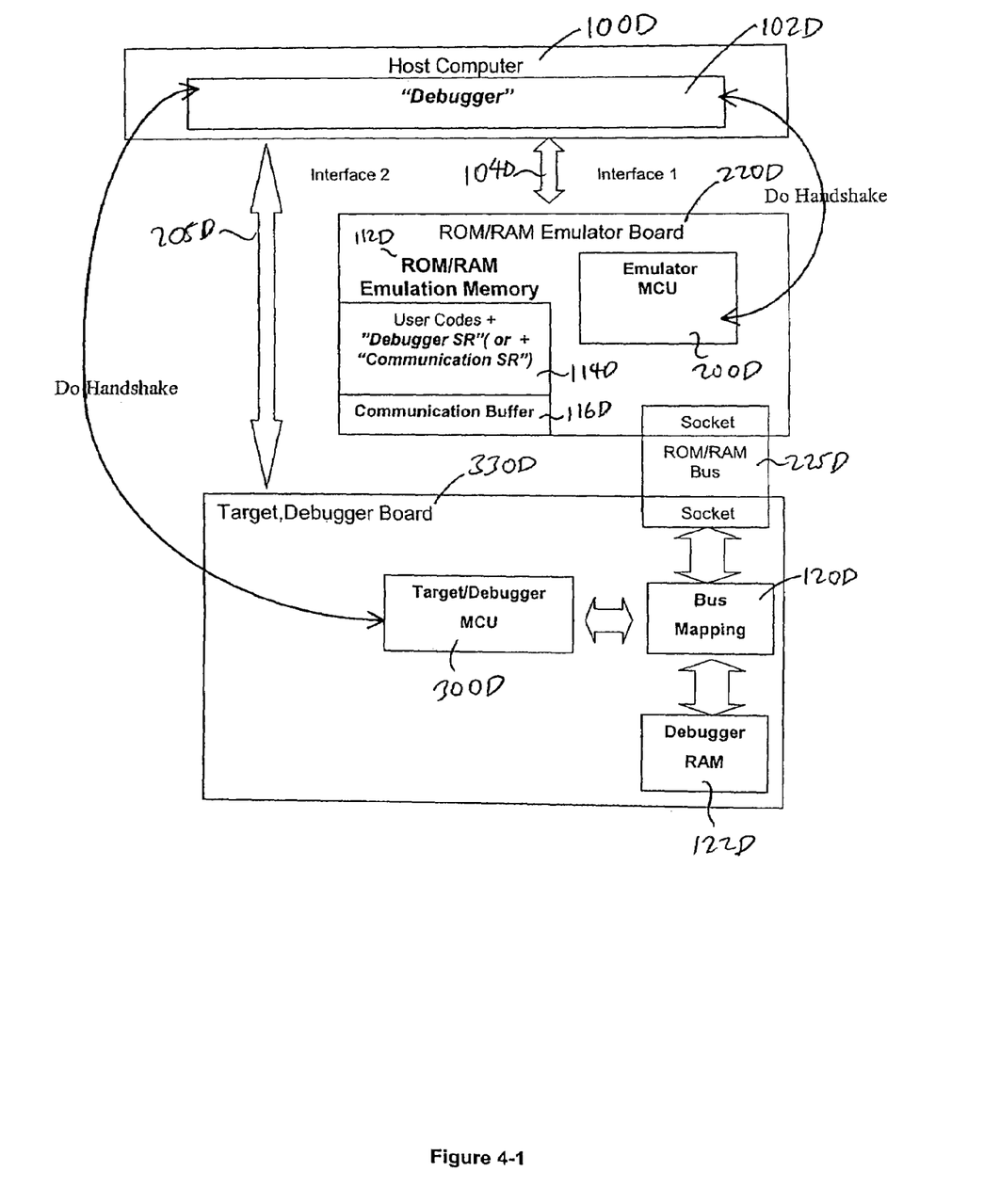
Figure 42:
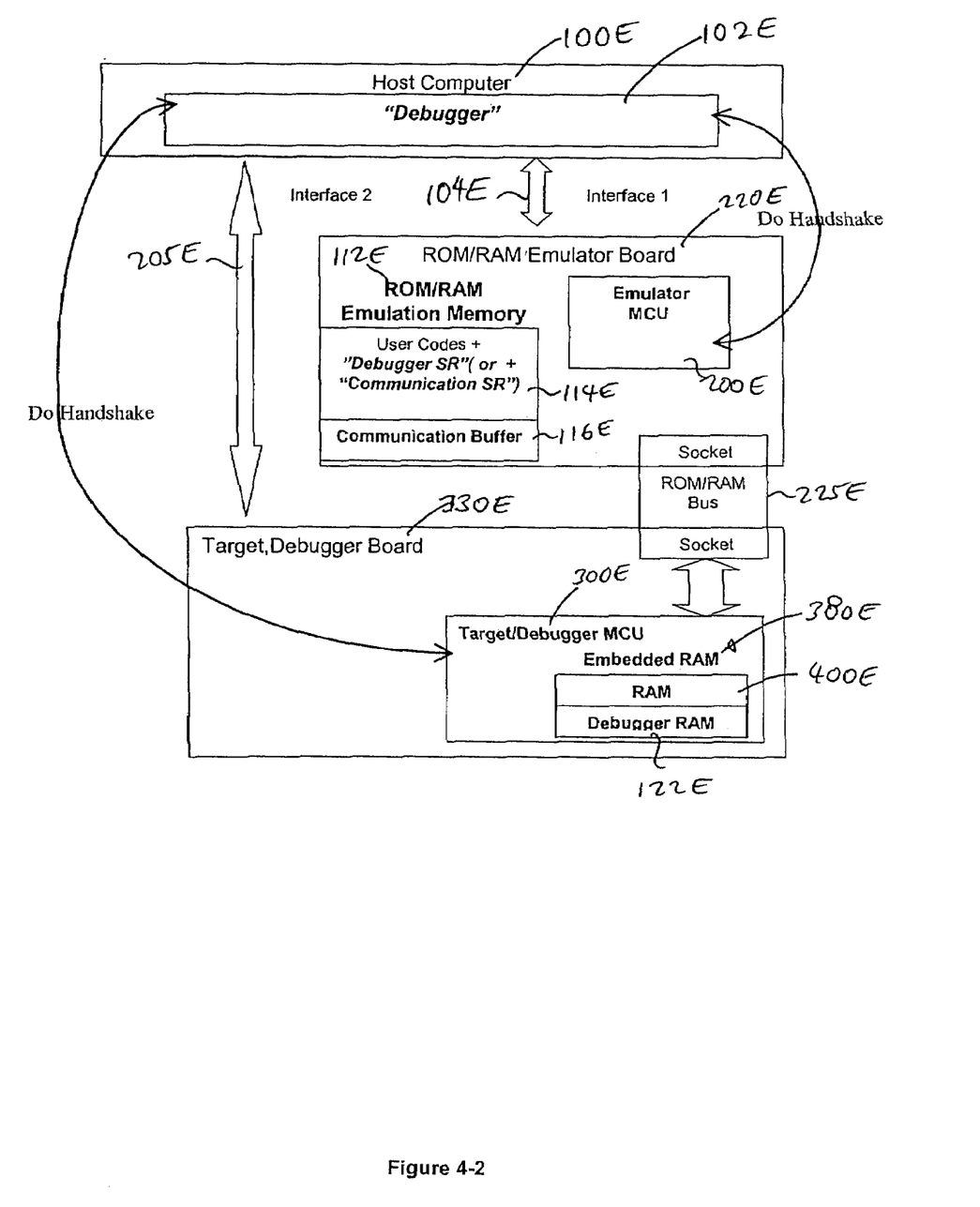

FIGS. 4-1 and 4-2 illustrate fourth embodiments in accordance with the present invention. Comparing FIGS. 3 and 4-1, the debugger RAM 122D, the bus mapping 120D and the target/debugger MCU 300D are now combined into one target/debugger board 330D in FIG. 4-1, with the communication MCU 310B being omitted. The system shown in FIG. 4-2 is further transformed from the embodiment shown in FIG. 4-1, by integrating the debugger RAM 122E in the target/debugger MCU 300E, and eliminating the bus mapping 120D. This integration can readily be done if the embedded memory 380E of the target/debugger MCU 300E is large enough, and the memory access signal is not out of the target/debugger MCU 300E when accessing the embedded memory 380E. A RAM 400E is also provided in the embedded memory 380E, and is used by the user program. The RAM 400E is not used by the debugger SR 114E, which only accesses the debugger RAM 122E.

One benefit that is provided by the embodiments in FIGS. 2, 3, 4-1 and 4-2 is that the system can use a conventional ROM/RAM emulator board 220A/B/D/E that can be made by any manufacturer. This helps to lower the overall cost of the system by providing a less complex new board (e.g., the debugger board 230 is less complex).

FIGS. 5-1, 5-2 and 5-3 illustrate fifth embodiments in accordance with the present invention, where they represent a further transformation from the embodiments shown in FIGS. 4-1 and 4-2. Comparing FIG. 5-1 with FIGS. 4-1 and 4-2, the ROM/RAM emulator board 220D/E and the target debugger board 330D/E are combined into one ROM/RAM emulator, debugger and target board 510F that communicates with the host computer 100F via interface 500F in FIG. 5-1. In addition, the ROM/RAM emulator MCU 200D/E and the target/debugger MCU 300DIE are now merged to form an emulator/debugger/target MCU 530F, which becomes the only MCU responsible for all functions of emulator MCU, debugger MCU and target MCU. In order to provide the emulator SR of the ROM/RAM emulator MCU, and the debugger SR of the target MCU, a ROM 520F is implemented to store those programs. Bus mapping unit 120F maps ROM/RAM emulation memory 112F, debugger RAM 122F and ROM 520F to form one continuous and linear addressing space.

Figure 51:
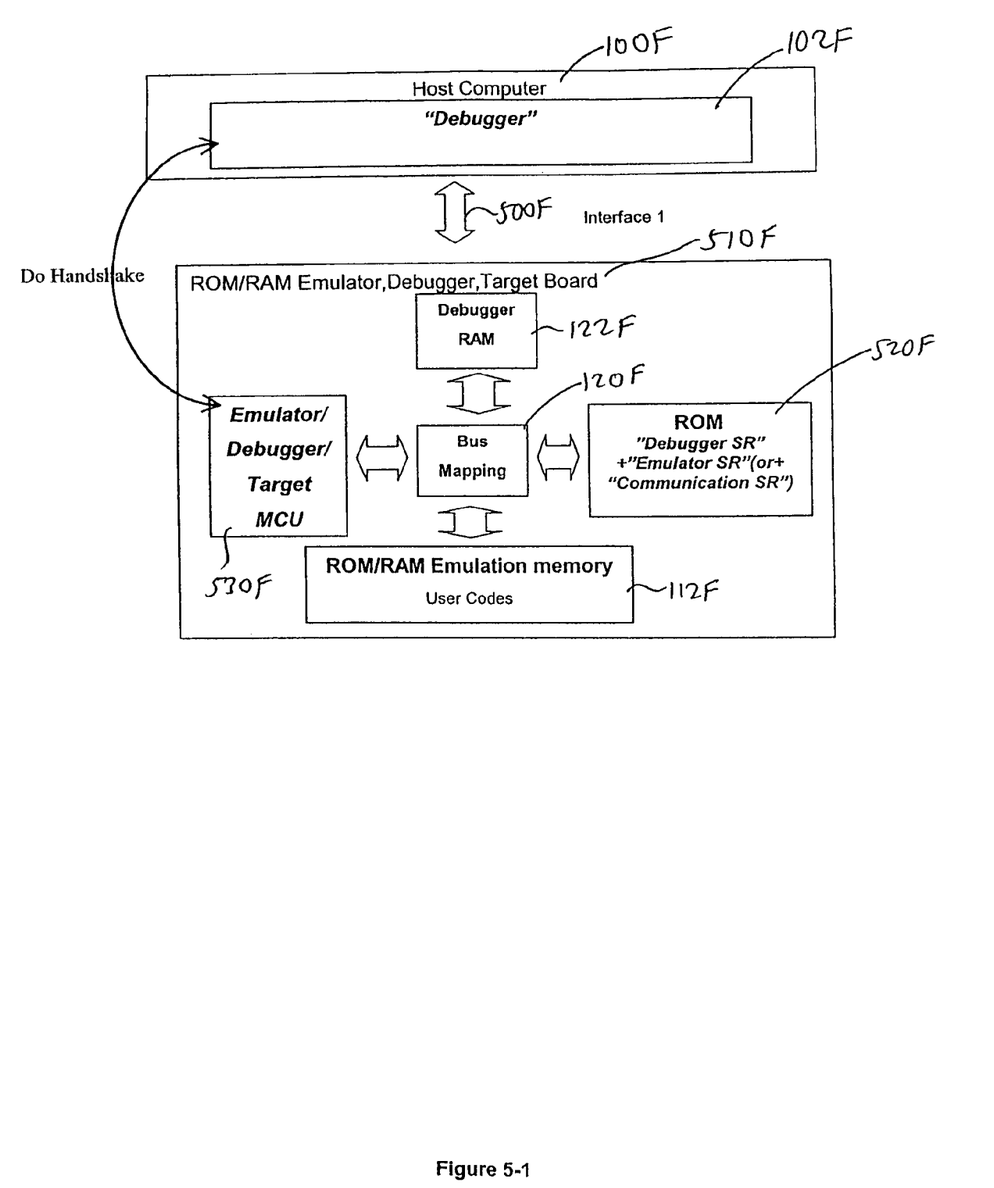
Figure 52:
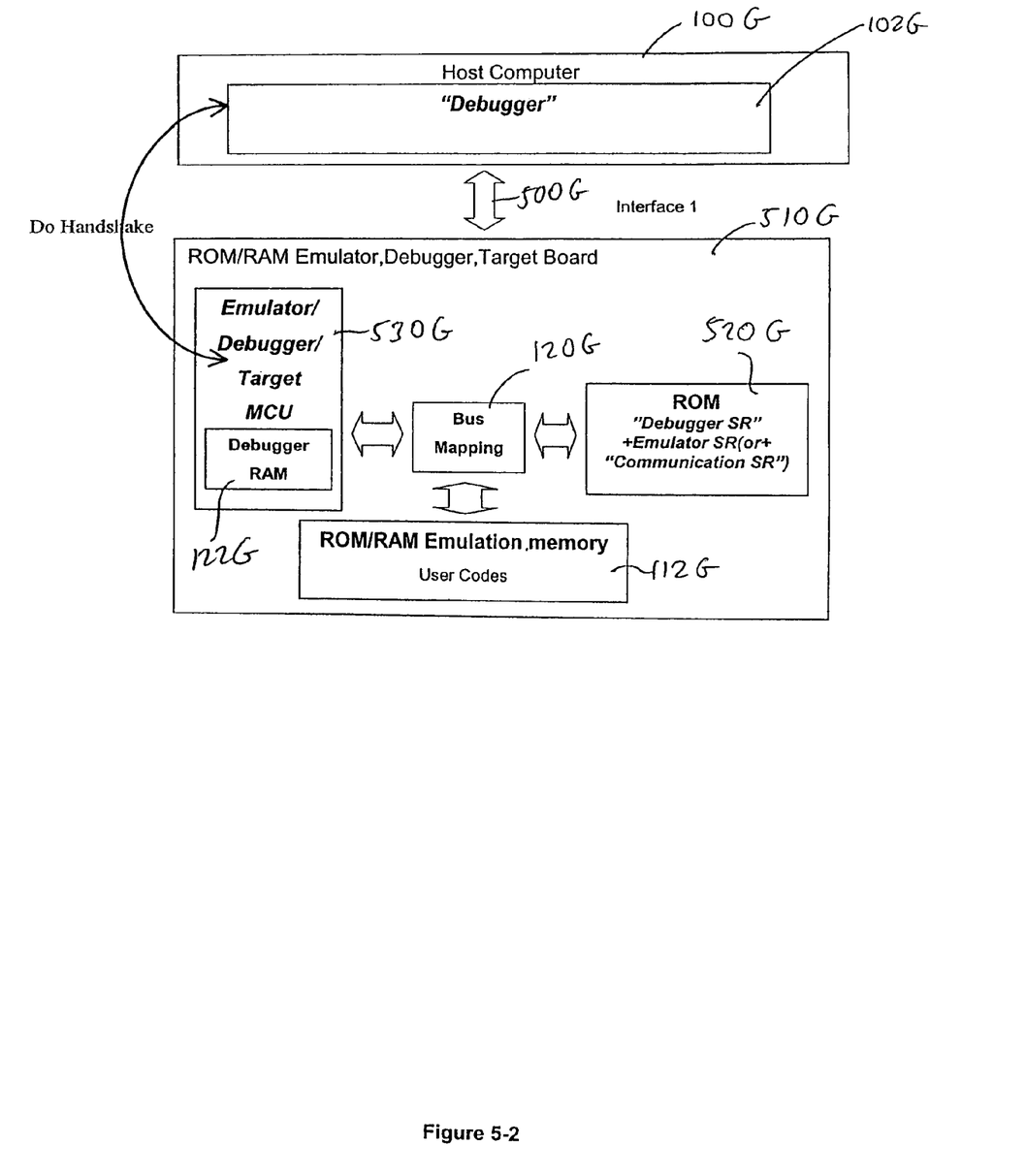

FIG. 5-2 is the same as FIG. 5-1, but can be further transformed from FIG. 5-1 by incorporating the debugger RAM 122G into the MCU 530G if the embedded memory of the MCU 530G is large enough. As a further alternative, if the RAM in MCU 530G is large enough, then the debugger RAM 122G can even be omitted.

Figure 53:
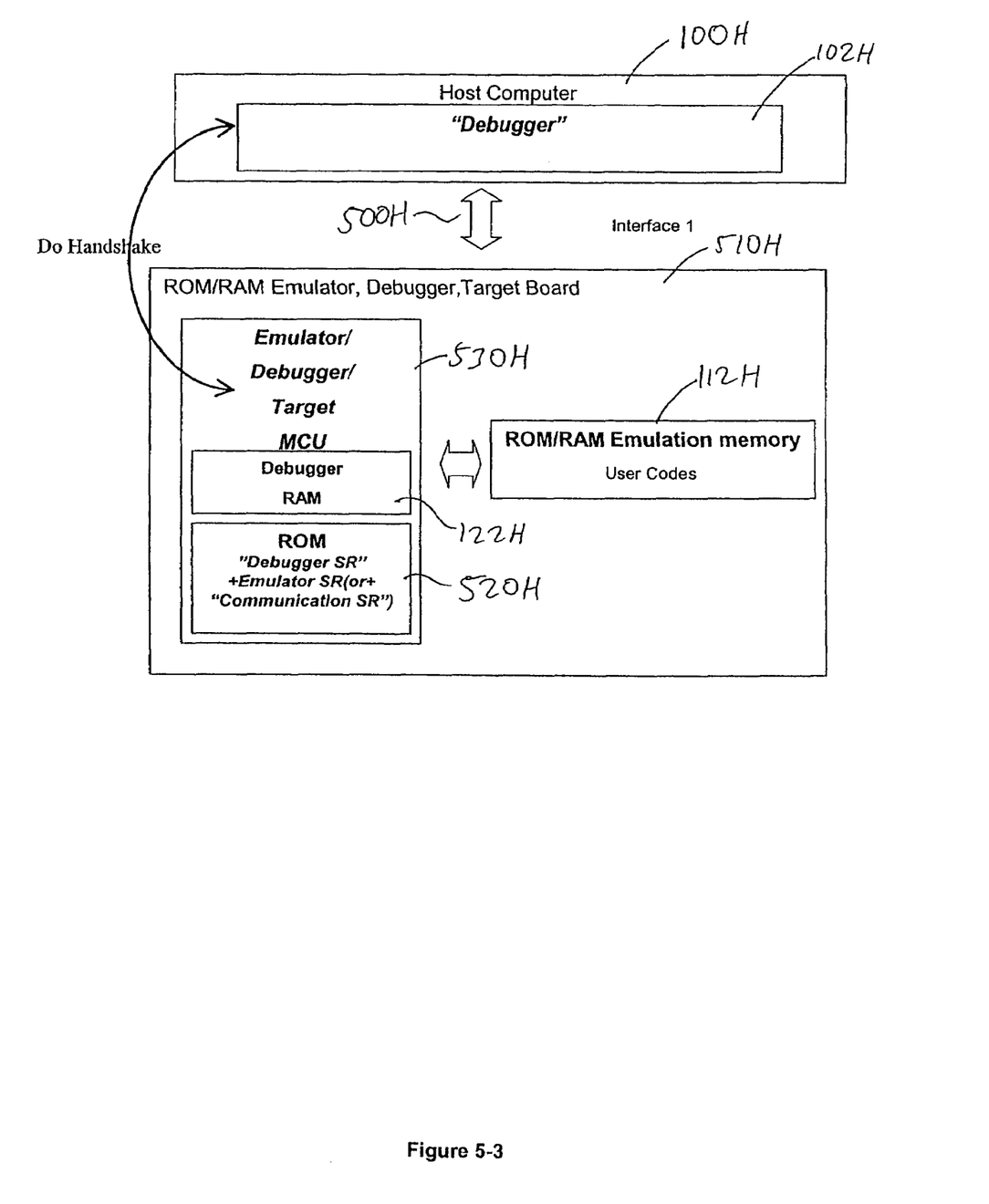

FIG. 5-3 is the same as FIG. 5-2, but can be further transformed from FIG. 5-2, where the MCU 530H now has an embedded ROM 520H for storing programs for the functions of downloading programs, and the functions of debugging control programs. As an alternative, if the MCU 530H has a ROM, then the ROM 520H can even be omitted.

Operation of the Present Invention in the Embodiments

Several models of the emulator/debugger process flow are utilized in connection with the different embodiments in accordance with the present invention. The following description will illustrate such different models. The models, while being different in their actual approach, nevertheless follow the same general inventive principles of the present invention. At a general level, with reference back to FIG. 1, the debugging operation begins when a user uses the debugger 102 in a host computer 100 (e.g. a PC), to debug a target board 130.

a) Download/Upload: Downloading/uploading user program codes with debugger SR 114. ROM/RAM emulator debugger board 110 is requested to write codes into ROM/RAM emulation memory 112, or to read codes from ROM/RAM emulation memory 112;

b) Debugging: Performing debugging functions such as free run/step into/step over/stop/upload state/modify states/set breakpoints/delete breakpoints. These debugging functions are well-known in the art and are not described in greater detail herein. The ROM/RAM emulator debugger board 110 is requested to perform debugging functions, and status or return values are received from the ROM/RAM emulator debugger board 110.

Different models of the emulator/debugger process flow are now described in greater detail.

Model 1

Model 1 uses the ROM/RAM emulator, debugger board 110 and the debugger 102 running on the host computer 100 to debug the target board 130. To illustrate the process flow, reference is now made to FIG. 1.

A. Download/Reset:

1. The debugger 102 sends download requests to the emulator/debugger MCU 118.
2. The emulator/debugger MCU 118 turns off the target MCU 132 to make the target MCU 132 release access to the ROM/RAM emulation memory 112.
3. The debugger 102 downloads the user codes and the debugger SR 114 via the emulator/debugger MCU 118 to the ROM/RAM emulation memory 112.
4. The emulator/debugger MCU 118 writes user codes and the debugger SR to the ROM/RAM emulation memory 112.
5. The emulator/debugger MCU 118 maintains two pieces of information:
   a. Original POI ("Power-On Initial") which is the first place to be executed upon power-on, and
   b. Original break interrupt vector which records the address of break service routine,
   to one of the following places: a) the debugger SR114; b) user codes (in a space not used by codes); c) the communication buffer 116; or d) the debugger RAM 122, by request of the debugger 102 or by itself.
6. The emulator/debugger MCU 118 writes two pieces of information (by the request of the debugger 102 or by itself):
   a. New POI (which is the address of the debugger SR 114) or a jump instruction to the debugger SR 114. Upon power-on, target MCU 132 will execute the debugger SR 114; and
   b. New break interrupt vector, which records the address of the debugger SR 114. When a break instruction is executed, the target MCU 132 will execute the debugger SR 114.

7. The emulator/debugger MCU 118 turns on the target board 130.
8. After power-on, the target MCU 132 executes the instructions in POI or jumps to the address recorded in POI. The debugger SR 114 is executed.
9. Target MCU 132 sends signals to emulator/debugger MCU 118 to notify it that target MCU 132 is in debugger SR 114 and is awaiting requests from debugger 102.
10. The emulator/debugger MCU 118 sends signals to the debugger 102 to notify it that the target MCU 132 is in the debugger SR 114 and is awaiting requests from debugger 102.

B. Debugging Function:

For Model 1, after download/reset, three methods can be implemented to perform the debugging function by using the debugger RAM 122, the communication buffer 116, or both. The debugging function will now be illustrated in reference to FIG. 1, taking "set one breakpoint" as an example. The methodology described herein, however, can readily be applied to the other embodiments of the present invention, and be applied to the other debugging functions as well.

Debugging Method 1: Debugger RAM Only

1. The debugger 102 sends a "set breakpoint" request to the emulator/debugger MCU 118. A breakpoint is a software instruction which will make the target MCU 132 execute the debugger SR 114. As used herein, "set breakpoint" means to write this software instruction to a location within the users programs.
2. The emulator/debugger MCU 118 stores the breakpoint request from the debugger 102 to the debugger RAM 122. Since the target MCU 132 is already running programs stored in the ROM/RAM emulation memory 112, access to the debugger RAM 122 by the emulator/debugger MCU 118 can proceed.
3. The emulation/debugger MCU 118 sends signals to the target MCU 132 and makes it run the debugger SR 114.
4. After receiving signals from the emulator/debugger MCU 118, the target MCU 132 runs the debugger SR 114 and parses the set breakpoint request stored in the debugger RAM 122.
5. After parsing the request stored in the debugger RAM 122, the target MCU 132 sets the breakpoint on user codes, and saves the status after setting a breakpoint to the debugger RAM 122.
6. The target MCU 132 notifies the emulator/debugger MCU 118 that the request has been completed and that the return status is stored in the debugger RAM 122. The target MCU 132 awaits new requests in the debugger SR 114. As used herein, the "return status" indicates whether the request succeeded or failed.
7. The emulator/debugger MCU 118 reads the return status from the debugger RAM 122 and sends it back to the debugger 102. Since the target MCU 132 is running programs stored the ROM/RAM emulation memory 112, access to the debugger RAM 122 by the emulator/debugger MCU 118 can proceed.

Debugging Method 2: Communication Buffer Only

1. The debugger 102 sends a "set breakpoint" request to the emulator/debugger MCU 118.
2. The emulator/debugger MCU 118 sends signals to the target MCU 132 and makes it run the debugger SR 114.
3. The target MCU 132 runs the debugger SR 114 and copies a "loop to itself" instruction to the debugger RAM 122.
4. The target MCU 132 notifies the emulator/debugger MCU 118 that access rights to the ROM/RAM emulation memory 112 will be released and jumps from the debugger SR 114 to run the "loop to itself" instruction to await new request.

5. The emulator/debugger MCU 118 stores "set one breakpoint" request from the debugger 102 to the communication buffer 116. Since the target MCU 132 is running programs in the debugger RAM 122, access to the ROM/RAM emulation memory 112 by the emulator/debugger MCU 118 can proceed.

6. The emulator/debugger MCU 118 sends signals to the target MCU 132 and makes it run the debugger SR 114.

7. After receiving signals from the emulator/debugger MCU 118, the target MCU 132 runs the debugger SR 114, and parses the "set breakpoint" request stored in the communication buffer 116.

8. After parsing the request, the target MCU 132 sets the breakpoint on user codes, and saves the status to the communication buffer 116.

9. The target MCU 132 copies a "loop to itself" instruction to the debugger RAM 122.

10. The target MCU 132 notifies the emulator/debugger MCU 118 that access rights to the ROM/RAM emulation memory 118 will be released and jumps from the debugger SR 114 to run the "loop to itself" instruction to await new requests.

11. The emulator/debugger MCU 118 reads the return status from the communication buffer 116 and sends it back to the debugger 102. Since the target MCU 132 is running programs in the debugger RAM 122, access to the ROM/RAM emulation memory 112 by the emulator/debugger MCU 118 can proceed.

Debugging Method 3: Debugger RAM and Communication Buffer

Method 3 is a hybrid method of both Method 1 and Method 2 so that both debugger RAM 122 and communication buffer 116 are used. Based on debugging methods 1 and 2 above, those skilled in the art will understand how to implement method 3.

Model 2

Model 2 utilizes a conventional (i.e., commercially available) ROM/RAM emulator board 220A operating in conjunction with a host computer 100A to debug the target board 130A. To illustrate the process flow, reference is now made to FIG. 2, of which the embodiment has the debugger 102A, the ROM/RAM emulator board 220A, the debugger board 230A, and the target board 130A.

A. Download/Reset:

1. The debugger 102A sends download request to the debugger MCU 210A.

2. The debugger MCU 210A turns off the target MCU 132A to make the target MCU 132A release its access to the ROM/RAM emulation memory 112A.

3. The debugger 102A downloads user codes and debugger SR 114A via the emulator MCU 200A to the ROM/RAM emulation memory 112A.

4. The emulator MCU 200A writes user codes and the debugger SR 114A to the ROM/RAM emulation memory 112A.

5. The emulator MCU 200A or the debugger MCU 210A maintains two pieces of information:
   a. Original POI ("Power-On Initial"), which is the first place to be executed upon power-on; and
   b. Original break interrupt vector, which records the address of break service routine,
   to one of the following places: a) the debugger SR 114A; b) user codes (in space not used by codes); c) the communication buffer 116A; or d) the debugger RAM 122A, by request of the debugger 102A or by itself.

6. The emulator MCU 200A or the debugger MCU 210A writes two pieces of information (by the request of the debugger 102A or by itself):
   a. New POI, which is the address of the debugger SR 114A or a jump instruction, to the debugger SR 114A. Upon power-on, the target MCU 132A will execute the debugger SR 114A; and
   b. New break interrupt vector, which records the address of the debugger SR 114A. When a break instruction is executed, the target MCU 132A will execute the debugger SR 114A.

7. The debugger MCU 210A powers on the target board 130A.

8. After power on, the target MCU 132A executes the instruction in POI or jumps to the address recorded in POI. Then, the target MCU 132A executes the debugger SR 114A.

9. The target MCU 132A notifies the debugger MCU 210A that the target MCU 132A is in the debugger SR 114A, and awaits requests from the debugger 102A.

10. The debugger MCU 210A notifies the debugger 102A that the target MCU 132A is in the debugger SR 114A and awaits requests from the debugger 102A.

B. Debugging Function:

For Model 2, after download/reset, three methods currently can be implemented to perform the debugging function by using the debugger RAM 122A, the communication buffer 116A, or both. The debugging function will now be illustrated in reference to FIG. 2, taking "set one breakpoint" as an example. The methodology described herein, however, can readily be applied to other embodiments of the present invention, and be applied to the other debugging functions as well.

Debugging Method 1: Debugger RAM Only

1. The debugger 102A sends a "set one breakpoint" request to the debugger MCU 210A.

2. The debugger MCU 210A stores the "set one breakpoint" request from the debugger 102A to the debugger RAM 122A. Since the target MCU 132A is running programs in the ROM/RAM emulation memory 112A, access to the debugger RAM 122A by the debugger MCU 210A can proceed.

3. The debugger MCU 210A sends signals to the target MCU 132A and makes it run the debugger SR 114A.

4. After receiving signals from the debugger MCU 210A, the target MCU 132A runs the debugger SR 114A, and parses the "set one breakpoint" request stored in the debugger RAM 122A.

5. After parsing, the target MCU 132A sets breakpoint on the user codes and saves the return status after setting a breakpoint to the debugger RAM 122A.

6. The target MCU 132A notifies the debugger MCU 210A that the request was completed, and that the return status is stored in the debugger RAM 122A. The target MCU 132A awaits new request in the debugger SR 114A.

7. The debugger MCU 210A reads the return status from the debugger RAM 122A and sends it back to the debugger 102A. Since the target MCU 132A is running programs in the ROM/RAM emulation memory 112A, access to the debugger RAM 122A by the debugger MCU 210A can proceed.

Debugging Method 2: Communication Buffer Only

1. The debugger 102A sends a "set one breakpoint" request to the debugger MCU 210A.

2. The debugger MCU 210A sends signals to the target MCU 132A and makes it run the debugger SR 114A.

3. The target MCU 132A runs the debugger SR 114A and copies a "loop to itself" instruction to the debugger RAM 122A.

4. The target MCU 132A notifies the debugger MCU 210A that access to the ROM/RAM emulation memory 112A will be released, and jumps from the debugger SR 114A to run to the "loop to itself" instruction to wait for new request.

5. The debugger MCU 210A stores the "set one breakpoint" request from the debugger 102A to the communication buffer 116A. Alternately, the "set one breakpoint" request from the debugger 102A is stored to the communication buffer 116A by the debugger 102A to send a write command to the emulator MCU 200A. Since the target MCU 132A is running programs in the debugger RAM 122A, the ROM/RAM emulation memory 112A can now be accessed by the emulator MCU 200A or by the debugger MCU 210A.

6. The debugger MCU 210A sends signals to the target MCU 132A and makes it run the debugger SR 114A.

7. After receiving signals from the debugger MCU 210A, the target MCU 132A runs the debugger SR 114A and parses the "set one breakpoint" request stored in the communication buffer 116A.

8. After parsing the request, the target MCU 132A sets the breakpoint on user codes, and saves the return status after setting to the communication buffer 116A.

9. The target MCU 132A copies a "loop to itself" instruction to the debugger RAM 122A.

10. The target MCU 132A notifies the debugger MCU 210A that access to the ROM/RAM emulation memory 112A will be released, and jumps from the debugger SR 114A to run the "loop to itself" instruction to await new requests.

11. The debugger MCU 210A reads the return status from the communication buffer 116A and sends it back to the debugger 102A. Since the target MCU 132A is running programs in the debugger RAM 122A, the ROM/RAM emulation memory 112A can now be accessed by the debugger MCU 210A.

12. Alternatively, instead of Step 11, the return status is read and sent by the emulator MCU 200A. Since the target MCU 132A is running programs in the debugger RAM 122A, the ROM/RAM emulation memory 112A can be accessed by the emulator MCU 200A.

Debugging Method 3: Debugger RAM and Communication Buffer

Method 3 is a hybrid method of both Method 1 and Method 2, so that both debugger RAM 122A and communication buffer 116A are used. Based on debugging methods 1 and 2 above, those skilled in the art will understand how to implement method 3.

Model 3

Model 3 uses a commercially-available ROM/RAM emulator, debugger RAM board 320B and a debugger 102B running on a host computer 100B to debug a target board 330B. To illustrate the process flow, reference is now made to FIG. 3, of which the embodiment has a debugger 102B, a ROM/RAM emulator board 220B, a debugger RAM board 320B, and a target/debugger board 330B. FIGS. 4-1 and 4-2 can also be operated under this model 3.

A. Download/Reset:

1. The debugger 102B turns off the target/debugger MPU 300B.

2. The debugger 102B downloads user codes and the debugger SR 114B via the emulator MCU 200B to the debugger SR 114B.

3. The emulator MCU 200B writes user codes and the debugger SR 114B to the ROM/RAM emulation memory 112B.

4. The emulator MCU 200B maintains two pieces of information:
   a. Original POI, which is the first place to be executed upon power-on; and
   b. Original break interrupt vector, which records the address of break service routine,
to one of the following places: a) the debugger SR 114B; b) user codes (in a space not used by codes); c) the communication buffer 116B; or d) the debugging RAM 122B, by request of the debugger 102B.

5. The emulator MCU 200B writes two pieces of information (by the request of the debugger 102B):
   a. New POI (which is the address of the debugger SR 114B) or a jump instruction to the debugger SR 114B. When power-on, the target/debugger MPU 300B will execute the debugger SR 114B.
   b. New break interrupt vector, which records the address of the debugger SR 114B. When a break instruction is executed, the target/debugger MPU 300B will execute the debugger SR 114B.

6. The debugger 102B powers on the target/debugger board 330B.

7. After power off, the target/debugger MPU 300B executes the instruction in POI, or jumps to the address recorded in POI. The debugger SR 114B is executed and awaits new request.

B. Debugging Function:

For Model 3, after download/reset, two methods currently can be implemented to perform the debugging function, by using either both debugger RAM 122B and communication buffer 116B, or neither of them. The debugging function will now be illustrated in reference to FIG. 3, taking the "set one breakpoint" as an example. The methodology described herein, however, can readily be applied to other embodiments in accordance with the present invention, including FIGS. 4-1 and 4-2.

Debugging Method 1: Debugger RAM and Communication Buffer

1. The debugger 102B sends signals to the target/debugger MPU 300B.

2. The target/debugger MPU 300B runs the debugger SR 114B and copies a "loop to itself" instruction to the debugger RAM 122B.

3. The target MPU 300B notifies the debugger 102B that access rights to the ROM/RAM emulation memory 112B will be released, and jumps from the debugger SR 114B to run "the loop to itself" instruction to await new request.

4. The debugger 102B writes a "set one breakpoint" request to the emulator MCU 200B, and the emulator MCU 200B stores the "set one breakpoint" request to the communication buffer 116B.

5. The debugger 102B sends signals to the target/debugger MCU 200B and makes it run the debugger SR 114B.

6. Upon receiving signals from the debugger 102B, the target/debugger MCU 200B runs the debugger SR 114B, and parses the "set one breakpoint" request stored in the communication buffer 116B.

7. After parsing the request, the target/debugger MCU 200B sets breakpoint on user codes, and saves the return status to the communication buffer 116B.

8. The target/debugger MCU 200B copies a "loop to itself" instruction to the debugger RAM 122B.

9. The target/debugger MCU 200B notifies the debugger 102B that access to the ROM/RAM emulation memory 112B will be released, and jumps from the debugger SR 114B to run the "loop to itself" instruction to await a new request.

10. The debugger 102B reads the return status from the communication buffer 116B by the emulator MCU 200B.

Debugging Method 2: Without Debugger RAM and Communication Buffer

1. The debugger 102B sends a "set breakpoint request" to the target/debugger MCU 300B.

2. The target/debugger MCU 300B receives the "set one breakpoint" request from the debugger 102B and runs the debugger SR 114B to perform the request.

3. The target/debugger MCU 300B returns the return status to the debugger 102B via Interface 205B, and awaits a new request from the debugger SR 114B.

Method 2 can be used if the target/debugger MCU 300B has a sufficiently-large RAM. In Method 2, since the debugger RAM board 320B is not used, it may be removed from the embodiment in FIG. 3 if Method 2 is used.

Model 4

Model 4 uses a ROM/RAM emulator, debugger, target board 510F and a debugger 102F running on host computer 100F to debug a target board. To illustrate the process flow, reference is now made to FIG. 5-1, of which the embodiment has a ROM/RAM emulator/debugger/target board 510F, in conjunction with a debugger 102F in a host computer 100F. The process flow of Model 4 can also be used for the embodiments in FIGS. 5-2 and 5-3.

A. Download/Reset:

1. Directly power on the ROM/RAM emulator, target, debugger board 510F, which runs the debugger SR in the ROM 520F immediately because the POI and "break" vector are all in ROM. They all point to the start address of the debugger SR. Emulator/target/debugger MCU 530F is executing the debugger SR, and awaiting requests from the debugger 102F.

2. The debugger 102F downloads user codes (Debugger SR is not necessary because it is now in ROM) to the emulator/target/debugger MCU 530F.

3. The emulator/target/debugger MCU 530F writes user codes to the RAM of the ROM/RAM emulation memory 112F.

4. The emulator/target/debugger MCU 530F keeps two pieces of information:
   a. original POI, which is the first place to be executed upon power on; and
   b. original break interrupt vector, which records the address of break service routine,
to the following places: a) user codes (in a space not used by others) and b) debugger RAM 122F, by request of the debugger 102F.

B. Debugging Function:

1. The debugger sends a "set one breakpoint" request to the emulator/debugger/target MCU 530F.

2. The emulator/debugger/target MCU 530F receives the "set one breakpoint request" from the debugger 102F and runs the debugger SR to perform the request.

3. The emulator/debugger/target MCU 530F returns the return status to, and awaits new request from, the debugger 102F.

The terms and expressions which have been used in the foregoing specification are used therein as terms of description and not of limitation, and there is no intention, in the use of such terms and expressions, of excluding equivalents thereof, it being recognized that the scope of the invention is defined and limited only by the claims which follow:

What is claimed is:

1. An apparatus for debugging an electronic system, said electronic system including a target microcontroller (MCU) and at least one ROM connected together, comprising:
  a debugger unit for debugging said target MCU;
  a debugger MCU for communicating with said debugger unit and with said target MCU, and for performing requests from said debugger unit and said target MCU;
  a ROM/RAM emulator board, connected to said debugger unit, said emulator board being disposed to emulate said ROM of said target MCU, said emulator board including a ROM/RAM emulation memory and an emulator MCU, said emulation memory being disposed to store user program codes downloaded from said debugger unit, said emulator MCU being disposed to read and write data from and to said ROM/RAM emulation memory; and
  a target/debugger board, connected to said emulator board, said target/debugger board including a bus mapping unit, a debugger RAM, said target MCU and said debugger MCU.

2. The apparatus of claim 1, further comprising a debugger service routine ("debugger SR") downloaded from said debugger unit into said ROM/RAM emulation memory with said user program codes from said debugger unit.

3. The apparatus of claim 2, further comprising a communication buffer implemented in said emulation memory, said communication buffer being disposed to store status, request and data by said target MCU and by said debugger MCU.

4. An apparatus for debugging an electronic system, comprising:
  a debugger unit;
  a ROM/RAM emulator/debugger/target board, connected to said debugger unit, said emulator/debugger/target board including:
    an emulator/debugger/target MCU having a target MCU that is debugged by the debugger unit, the emulator/debugger/target MCU communicating with said debugger unit, and performing requests from said debugger unit and said target MCU;
    a debugger RAM that stores requests;
    a bus mapping unit;
    a ROM memory, disposed to store service routines, the ROM memory further including a debugger service routine ("debugger SR") which parses the requests issued by the debugger RAM; and
    a ROM/RAM emulation memory being disposed to store user program codes downloaded from said debugger unit.

5. The apparatus of claim 4, wherein said debugger RAM is implemented inside the emulator/debugger/target MCU.

6. An apparatus for debugging an electronic system, comprising:
  a debugger unit;
  a ROM/RAM emulator/debugger/target board, connected to said debugger unit, said emulator/debugger/target board including:

an emulator/debugger/target MCU having a target MCU that is debugged by the debugger unit, the emulator/debugger/target MCU communicating with said debugger unit, and performing requests from said debugger unit and said target MCU, said emulator/debugger/target MCU including a debugger RAM and a ROM memory, with the debugger RAM storing requests;

a ROM/RAM emulation memory being disposed to store user program codes downloaded from said debugger unit; and a debugger service routine ("debugger SR") which parses the requests stored by the debugger RAM.

* * * * *